United States Patent
Chen et al.

(10) Patent No.: US 12,546,014 B2
(45) Date of Patent: Feb. 10, 2026

(54) CLOSED LOOP COOLING WATER CORROSION INHIBITION EMPLOYING POLYMALEATES AND NON-BORATE BUFFERS

(71) Applicant: ECOLAB USA INC., St. Paul, MN (US)

(72) Inventors: Bingzhi Chen, Naperville, IL (US); Michael Patrick Weberski, Jr., Sugar Grove, IL (US); Zhangzhang Yin, Aurora, IL (US)

(73) Assignee: Ecolab USA Inc., St. Paul, MN (US)

( * ) Notice: Subject to any disclaimer, the term of this patent is extended or adjusted under 35 U.S.C. 154(b) by 54 days.

(21) Appl. No.: 17/308,719

(22) Filed: May 5, 2021

(65) Prior Publication Data

US 2021/0371988 A1    Dec. 2, 2021

Related U.S. Application Data

(60) Provisional application No. 62/704,771, filed on May 28, 2020.

(51) Int. Cl.
| | |
|---|---|
| C23F 11/12 | (2006.01) |
| C23F 11/14 | (2006.01) |
| C23F 11/173 | (2006.01) |
| C23F 11/18 | (2006.01) |

(52) U.S. Cl.
CPC .......... C23F 11/149 (2013.01); C23F 11/124 (2013.01); C23F 11/173 (2013.01); C23F 11/181 (2013.01)

(58) Field of Classification Search
CPC ....... C23F 11/08; C23F 11/124; C23F 11/149; C23F 11/173; C23F 11/181; C23F 11/182; C02F 5/08; C02F 5/10; C02F 5/105
See application file for complete search history.

(56) References Cited

U.S. PATENT DOCUMENTS

| | | | | |
|---|---|---|---|---|
| 4,089,796 A | * | 5/1978 | Harris | C23F 11/08 |
| | | | | 252/396 |
| 4,547,540 A | | 10/1985 | Yeoman | |
| 5,062,962 A | * | 11/1991 | Brown | C23F 11/08 |
| | | | | 252/180 |
| 5,256,332 A | * | 10/1993 | Kessler | C23F 11/08 |
| | | | | 252/396 |
| 5,378,372 A | * | 1/1995 | Carey | C02F 5/14 |
| | | | | 210/698 |
| 5,382,367 A | * | 1/1995 | Zinkan | C23F 11/08 |
| | | | | 252/394 |
| 5,518,629 A | * | 5/1996 | Perez | C02F 5/10 |
| | | | | 252/396 |
| 5,549,832 A | * | 8/1996 | Ische | C09K 5/20 |
| | | | | 210/729 |
| 6,103,686 A | * | 8/2000 | Asakawa | C02F 5/10 |
| | | | | 510/480 |
| 6,146,538 A | * | 11/2000 | Martin | C02F 5/105 |
| | | | | 252/181 |
| 6,203,719 B1 | * | 3/2001 | Turcotte | C23F 11/08 |
| | | | | 252/75 |
| 6,228,283 B1 | * | 5/2001 | Turcotte | C02F 5/10 |
| | | | | 252/75 |
| 6,585,933 B1 | * | 7/2003 | Ehrhardt | C23F 11/149 |
| | | | | 252/396 |
| 6,814,930 B1 | | 11/2004 | Oldsberg et al. | |
| 8,207,102 B2 | * | 6/2012 | Smith | C11D 3/046 |
| | | | | 510/180 |
| 8,729,006 B2 | * | 5/2014 | Miralles | C02F 5/10 |
| | | | | 510/253 |
| 2010/0111756 A1 | * | 5/2010 | Crovetto | C02F 5/105 |
| | | | | 252/387 |
| 2010/0178197 A1 | | 7/2010 | Sotoudeh et al. | |
| 2013/0055508 A1 | * | 3/2013 | Miralles | C11D 3/10 |
| | | | | 510/476 |

(Continued)

FOREIGN PATENT DOCUMENTS

| | | | | |
|---|---|---|---|---|
| CA | 1340659 C | * | 7/1999 | ............... C02F 5/14 |
| CA | 2252060 A1 | * | 5/2000 | ............. C02F 5/105 |
| CA | 2208731 C | * | 5/2006 | ............. C23F 11/10 |

(Continued)

OTHER PUBLICATIONS

Batista, J.F. et al., "In situ corrosion control in industrial water systems," Biodegradation, 2000, vol. 11, pp. 441-448.

(Continued)

Primary Examiner — Matthew R Diaz
(74) Attorney, Agent, or Firm — Eric D. Babych; Barnes & Thornburg LLP

(57) ABSTRACT

A method of inhibiting corrosion of a metal surface in contact with an aqueous medium is provided. The method may include contacting the metal surface with a corrosion inhibitor composition where the corrosion inhibitor composition may include a compound or salt thereof of formula (I). The disclosed corrosion inhibitor composition is especially useful for inhibiting corrosion in closed loop systems.

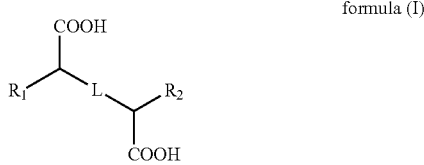

formula (I)

5 Claims, No Drawings

(56) References Cited

U.S. PATENT DOCUMENTS

| | | | | |
|---|---|---|---|---|
| 2015/0118103 A1 | * | 4/2015 | Erickson | C23F 11/187 252/389.1 |
| 2018/0305617 A1 | | 10/2018 | Gill et al. | |

FOREIGN PATENT DOCUMENTS

| | | | | |
|---|---|---|---|---|
| CN | 1068312 A | | 1/1993 | |
| CN | 1240769 A | | 1/2000 | |
| CN | 1417139 A | | 5/2003 | |
| CN | 1565986 A | | 1/2005 | |
| CN | 1565993 A | | 1/2005 | |
| CN | 1772656 A | | 5/2006 | |
| CN | 1785853 A | | 6/2006 | |
| CN | 1850661 A | | 10/2006 | |
| CN | 1915866 A | | 2/2007 | |
| CN | 1931745 A | * | 3/2007 | |
| CN | 101412565 A | | 4/2009 | |
| CN | 102198982 A | | 9/2011 | |
| CN | 102417243 A | | 4/2012 | |
| CN | 102476871 A | | 5/2012 | |
| CN | 102491544 A | | 6/2012 | |
| CN | 102730846 A | | 10/2012 | |
| CN | 102815796 A | | 12/2012 | |
| CN | 102923868 A | | 2/2013 | |
| CN | 102976512 A | | 3/2013 | |
| CN | 103420506 A | | 12/2013 | |
| CN | 103803716 A | | 5/2014 | |
| CN | 103803739 A | | 5/2014 | |
| CN | 104326578 A | | 2/2015 | |
| CN | 104609578 A | | 5/2015 | |
| CN | 104671447 A | | 6/2015 | |
| CN | 104743688 A | * | 7/2015 | C02F 5/10 |
| CN | 106145391 A | * | 11/2016 | C23F 11/144 |
| CN | 106242092 A | | 12/2016 | |
| CN | 106242096 A | | 12/2016 | |
| CN | 106396137 A | | 2/2017 | |
| CN | 106430649 A | | 2/2017 | |
| CN | 106477739 A | | 3/2017 | |
| CN | 106477741 A | | 3/2017 | |
| CN | 106745835 A | | 5/2017 | |
| CN | 106745837 A | | 5/2017 | |
| CN | 107055821 A | | 8/2017 | |
| CN | 107200408 A | | 9/2017 | |
| CN | 107512783 A | | 12/2017 | |
| CN | 107522303 A | | 12/2017 | |
| CN | 107686174 A | | 2/2018 | |
| CN | 107686175 A | | 2/2018 | |
| CN | 107814441 A | | 3/2018 | |
| CN | 107902829 A | | 4/2018 | |
| CN | 108017763 A | | 5/2018 | |
| CN | 108751449 A | | 11/2018 | |
| CN | 110066027 A | | 7/2019 | |
| CN | 110066028 A | | 7/2019 | |
| EP | 459661 A | * | 12/1991 | C02F 5/08 |
| EP | 0479465 A2 | | 4/1992 | |
| EP | 0480589 A1 | | 4/1992 | |
| EP | 1340840 A2 | | 9/2003 | |
| GB | 2181735 A | * | 4/1987 | C02F 5/10 |
| JP | S5278695 A | | 7/1977 | |
| JP | S62193698 A | | 8/1987 | |
| JP | S63258697 A | | 10/1988 | |
| JP | H02159391 A | | 6/1990 | |
| JP | H0347593 A | | 2/1991 | |
| JP | H0360799 A | | 3/1991 | |
| JP | H04166298 A | | 6/1992 | |
| JP | 2000271564 A | | 10/2000 | |
| JP | 2003080294 A | | 3/2003 | |
| JP | 2004091835 A | * | 3/2004 | C23F 11/173 |
| JP | 2004107248 A | * | 4/2004 | C02F 5/10 |
| JP | 2008249285 A | | 10/2008 | |
| JP | 2009249735 A | | 10/2009 | |
| JP | 2010202893 A | | 9/2010 | |
| JP | 2012041606 A | | 3/2012 | |
| JP | 2012106197 A | | 6/2012 | |
| MX | 2013004955 A | | 6/2013 | |
| RO | 83298 A2 | | 3/1984 | |
| RO | 112635 B1 | | 11/1997 | |
| WO | 2000066810 A1 | | 11/2000 | |
| WO | 2010051141 A1 | | 5/2010 | |
| WO | 2010062461 A1 | | 6/2010 | |
| WO | 2013026242 A1 | | 2/2013 | |
| WO | 2014105763 A1 | | 7/2014 | |
| WO | 2015065733 A1 | | 5/2015 | |
| WO | 2016206592 A1 | | 12/2016 | |
| WO | 2017079939 A1 | | 5/2017 | |
| WO | WO-2018217697 A1 | * | 11/2018 | C02F 5/105 |

OTHER PUBLICATIONS

PCT International Search Report and Written Opinion for PCT/US2021/030916, mailed Aug. 24, 2021, 13 pages.

* cited by examiner

CLOSED LOOP COOLING WATER CORROSION INHIBITION EMPLOYING POLYMALEATES AND NON-BORATE BUFFERS

BACKGROUND

1. Field of the Invention

The present disclosure generally relates to corrosion inhibitor compositions. More particularly, the disclosure pertains to corrosion inhibitor compositions containing polymaleates for inhibiting corrosion in closed-loop water circulating systems.

2. Description of the Related Art

In closed-loop water circulating systems, water is circulated for long periods typically without addition or removal of water. Removal of the water may be necessitated due to contamination. For example, some chemical additives provide a nutrient source for microorganisms to grow and form biofilms or other deposits that prevent efficient heat transfer. Chemical agents are often added to prevent microbial growth or prevent corrosion of any metals in contact with the circulating water stream.

Carbon steel corrosion inhibition has evolved over many decades from the use of chromate to the current heavy metals and phosphate chemistries. Several decades ago, chromate was banned and was predominantly replaced by molybdenum, zinc, silicate and phosphate. Several advances have been made in the phosphate chemistries from the use of orthophosphate to polyphosphate and the use of organic phosphates, phosphonates, and phosphinates. Currently, phosphorus is under environmental pressure and may only be used in very low-level quantities.

Ferrous metals, such as carbon steel, are among the most commonly used structural materials in industrial systems. Loss of the metals from surfaces resulting from general corrosion causes deterioration of the structural integrity of the system or structure because of reduction of mechanical strength. Localized corrosion (e.g. pitting) may pose an even greater threat to the normal operation of the system than general corrosion because such corrosion will occur intensely in one particular location and may cause perforations in the system structure carrying an industrial water stream. These perforations may cause leaks, which require shutdown of the entire industrial system so that repair can be made. Indeed, corrosion problems usually result in immense maintenance costs, as well as costs incurred because of equipment failure.

Although steel is still widely used, the use of aluminum or an aluminum alloy is increasing because of more desirable thermal properties such as thermal conductivity and diffusivity. Aluminum and aluminum alloys are stable in ambient conditions, but are prone to corrosion in aqueous conditions, especially at elevated temperatures and in the presence of chlorine ions. Aluminum heating elements are not compatible with conventional high pH corrosion inhibition programs.

Corrosion protection of metals in industrial water systems is often achieved by adding a corrosion inhibitor. Many corrosion inhibitors, including chromate, molybdate, zinc, nitrite, orthophosphate, and polyphosphate have been used previously, alone or in combination, in various chemical treatment formulations. However, these inorganic chemicals can be toxic, detrimental to the environment, and/or not very effective against localized corrosion, especially at economically feasible and/or environmentally acceptable low dosage levels.

BRIEF SUMMARY

A method of inhibiting corrosion of a metal surface in contact with an aqueous medium is provided. The method may include contacting the metal surface in a closed loop system with a corrosion inhibitor composition where the corrosion inhibitor composition may include a compound or salt thereof of formula (I)

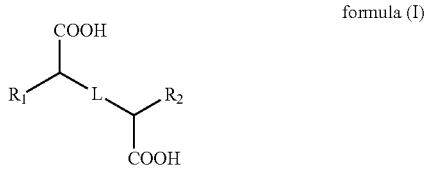

formula (I)

where L is a single bond or a double bond; $R_1$ is hydrogen, $-CH_2-COOH$,

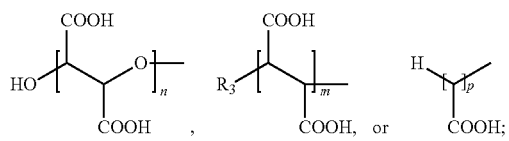

n is an integer from 1 to 100; m is an integer from 1 to 100; p is an integer from 2 to 20; $R_3$ is $-OH$, $-OCH_3$, an aryl group, or a $C_1$-$C_4$ alkyl; and $R_2$ is hydrogen, $-OH$, $-OCH_3$, an aryl group, or a $C_1$-$C_4$ alkyl.

In some aspects, $R_1$ is

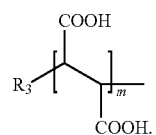

In some aspects, $R_1$ is

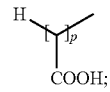

L is a double bond; and $R_2$ is hydrogen.

In some aspects, $R_1$ is

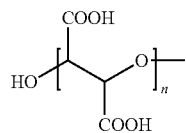

and $R_2$ is $-OH$.

In some aspects, the corrosion inhibitor composition further comprises a non-borate buffer.

In some aspects, the corrosion inhibitor composition further comprises a nitrate.

In some aspects, the buffer is triethanolamine (TEA), morpholine, N-methylimidazole, 1,4-diazabicyclo[2.2.2]octane, quinuclidine, urotropin, imidazole, methylimidazole, p-phenolsulfonate, diethylethanolamine, methoxypropylamine, borate, phosphate, bicine, glycine, diethylenetriamine, triethylenetetramine, or any combination thereof.

In some aspects, the buffer is a carbonate buffer.

In some aspects, the corrosion inhibitor composition further comprises a silicate.

In some aspects, the corrosion inhibitor composition further comprises an azole selected from the group consisting of tolytriazole (TT), benzotriazole (BZT), mercaptobenzothiazole (MBT), butyl benzotriazole (BBT), halogen resistant azole (HRA), a benzimidazole, and any combination thereof.

In some aspects, the azole is TT.

In some aspects, the corrosion inhibitor composition further comprises water.

In some aspects, the aqueous medium has a pH of from about 6 to about 12.

In some aspects, the corrosion inhibitor composition does not include at least one of nitrite, phosphorus, borate, or molybdate.

In some aspects, the method may include adding the corrosion inhibitor composition to the aqueous medium at a concentration of the compound of formula (I) of from about 10 ppm to about 50,000 ppm.

In some aspects, the corrosion inhibitor composition comprises about 1% to about 99% by weight of the polymaleic acid; about 0.5% to about 90% by weight of the silicate; and about 0.5% to about 20% by weight of the buffer.

In some aspects, the metal surface comprises a mild steel, copper, a copper alloy, iron, an iron alloy, admiralty brass, about 90% copper and about 10% nickel, about 80% copper and about 20% nickel, about 70% copper and about 30% nickel, aluminium, aluminium alloys, aluminium brass, manganese brass, leaded naval bronze, phosphor bronze, galvanized steel, and any combination thereof.

A corrosion inhibitor composition is provided, which may include a silicate; a buffer; and a compound or salt thereof of formula (I)

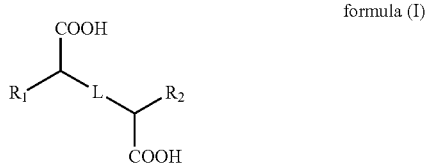

formula (I)

where L is a single bond or a double bond; $R_1$ is hydrogen, —$CH_2$—COOH.

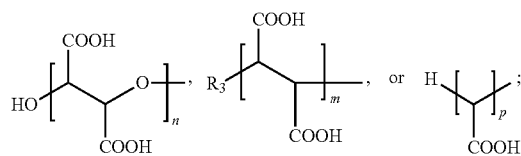

$n$ is an integer from 1 to 100; $m$ is an integer from 1 to 100; $p$ is an integer from 2 to 20; $R_3$ is —OH, —$OCH_3$, an aryl group, or a $C_1$-$C_4$ alkyl; and $R_2$ is hydrogen, —OH, —$OCH_3$, an aryl group, or a $C_1$-$C_4$ alkyl.

A use of a corrosion inhibitor composition for inhibiting corrosion of a metal surface in contact with an aqueous medium is provided. The corrosion inhibitor composition may include a compound of formula (I) or salt thereof; a silicate; and a buffer.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

DETAILED DESCRIPTION

Various embodiments are described below. The relationship and functioning of the various elements of the embodiments may better be understood by reference to the following detailed description. However, embodiments are not limited to those illustrated below. In certain instances details may have been omitted that are not necessary for an understanding of embodiments disclosed herein.

A method of inhibiting corrosion of a metal surface in contact with an aqueous medium is provided. The method may include contacting the metal surface in a closed loop system with a corrosion inhibitor composition.

As used herein "closed loop system" refers to a system that keeps the aqueous medium completely enclosed inside pipes or containers. A closed loop system includes closed recirculating or closed hydronic loops that utilize a water-based solution to transfer heat. Closed loop systems can be constructed from a variety of materials such as steel, copper, copper alloys, aluminum, aluminum alloys, and galvanized steel.

The closed loop system may include a surge or expansion tank that operates at atmospheric or elevated pressure. Air vents are used in the system to help remove oxygen and other gases from the system at start-up. The closed loop system may also include a pump to circulate the aqueous medium throughout the system.

In contrast, open systems expose the surface of the aqueous medium to outside air, which results in loss of the water to evaporation or exposes the water to higher risk of contamination.

The present disclosure relates to corrosion inhibitor compositions and methods for inhibiting corrosion. The inhibitor compositions can effectively reduce, inhibit, and/or prevent corrosion and/or scale in soft or hard water on surfaces, such as those comprising metals.

The corrosion inhibitor composition may include a compound or salt thereof of formula (I)

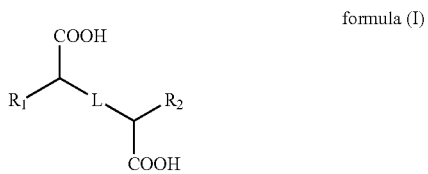

formula (I)

where L is a single bond or a double bond; R₁ is hydrogen, —CH₂—COOH,

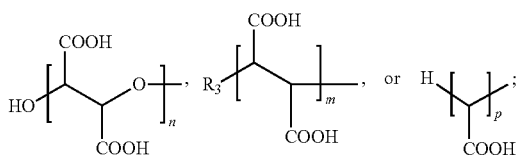

n is an integer from 1 to 100; m is an integer from 1 to 100; p is an integer from 2 to 20; $R_3$ is —OH, —OCH₃, an aryl group, or a $C_1$-$C_4$ alkyl; and $R_2$ is hydrogen, —OH, —OCH₃, an aryl group, or a $C_1$-$C_4$ alkyl.

In some aspects, L is a single bond. In some aspects, L is a double bond. In some aspects, L is a double bond and $R_2$ is hydrogen.

In some aspects, $R_1$ is hydrogen. In some aspects, $R_1$ is —CH₂—COOH.

In some aspects, $R_1$ is

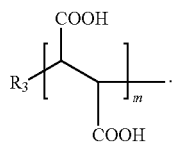

In some aspects, $R_3$ is —OH, —OCH₃, an aryl group, or a $C_1$-$C_4$ alkyl. In some aspects, $R_3$ is an aryl group. Examples of aryl groups include, but are not limited to, benzene and $C_{1-2}$ alkyl-substituted phenyl groups such as toluene or xylene. The integer m may be 1, 2, 3, 4, 5, 6, 7, 8, 9, 10, 11, 12, 13, 14, 15, 16, 17, 18, 19, or 20. In some aspects, m is an integer from 1 to 10. In some aspects, m is an integer from 1 to 50. In some aspects, m is an integer from 1 to 100.

In some aspects, $R_1$ is

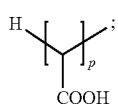

L is a double bond; and $R_2$ is hydrogen. The integer p may be 1, 2, 3, 4, 5, 6, 7, 8, 9, 10, 11, 12, 13, 14, 15, 16, 17, 18, 19, or 20. In some aspects, p is an integer from 1 to 10.

In some aspects, $R_1$ is

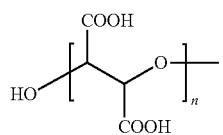

and $R_2$ is —OH. The integer n may be 1, 2, 3, 4, 5, 6, 7, 8, 9, 10, 11, 12, 13, 14, 15, 16, 17, 18, 19, or 20. In some aspects, n is an integer from 1 to 10. In some aspects, m is an integer from 1 to 50. In some aspects, m is an integer from 1 to 100.

In some aspects, $R_2$ is hydrogen. In some aspects, $R_2$ is —OH. In some aspects, $R_2$ is —OCH₃. In some aspects, $R_2$ is a $C_1$-$C_4$ alkyl. In some aspects, $R_2$ is an aryl group. Examples of aryl groups include, but are not limited to, benzene and $C_{1-2}$ alkyl-substituted phenyl groups such as toluene or xylene.

In some aspects, the corrosion inhibitor composition includes a hydrolyzed polymaleic acid compound according to the structures shown below. The composition may include one or more of the compounds below.

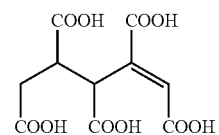

III

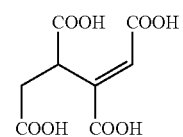

IV

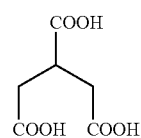

V

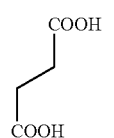

VI

In some aspects, the hydrolyzed polymaleic acid comprises compound III. In some aspects, the hydrolyzed polymaleic acid comprises compound IV. In some aspects, the hydrolyzed polymaleic acid comprises compound V. In some aspects, the hydrolyzed polymaleic acid comprises compound VI. In some aspects, the compound of formula (I) or salt thereof is sodium (3-methylphenyl) methylbutanedioate or sodium (4-methylphenyl) methyl butanedioate. In some aspects, the compound of formula (I) is 1,2,3,4-butanetetracarboxylic acid or a salt thereof.

In some aspects, the corrosion inhibitor composition includes a polymaleic acid having toluene, benzene, or xylene end group.

In some aspects, the corrosion inhibitor composition includes a polyepoxysuccinic acid or salt thereof.

The salts of the compounds of formulae (I)-(VI), hydrolyzed polymaleic acid, and polymaleic acid include, but are not limited to, sodium, potassium, ammonium, and other ammonium cations such as triethanolammonium, morpholinium, cyclohexylammonium, etc.

The corrosion inhibitor composition may further include a buffer. The buffer may be a non-borate buffer such as a carbonate buffer or the buffer may be a primary amine, a secondary amine, or a tertiary amine. Examples of buffers include, but are not limited to, TEA, morpholine, N-methylimidazole, 1,4-diazabicyclo[2.2.2]octane, quinuclidine, urotropin, imidazole, methylimidazole, p-phenolsulfonate, diethylethanolamine, methoxypropylamine, triethylenetramine, diethylenetriamine, borate, phosphate, bicine, glycine, or any combination thereof.

Other buffers useful in the present disclosure include, but are not limited to, the Good's buffers such as BES, CAPS, HEPES, MES, EPPS, MOPS, PIPES, TAPS, TES, and TRICINE.

The corrosion inhibitor compositions disclosed herein can provide corrosion protection on par with commercially available corrosion inhibitors such as nitrites. In some aspects, the corrosion inhibitor composition does not include at least one of nitrite, phosphorus, borate, or molybdate. In some aspects, the corrosion inhibitor composition does not include tin. In some aspects, the corrosion inhibitor composition does not include zinc.

The corrosion inhibitor composition may further include other additives such as nitrates or silicates. In some aspects, the corrosion inhibitor composition includes a nitrate. An example of a nitrate includes, but is not limited to, sodium nitrate. In some aspects, the corrosion inhibitor composition includes a silicate. Examples of silicates include, but are not limited to, metasilicate, orthosilicate, pyrosilicate, and salts thereof. The silicate may be sodium metasilicate.

The corrosion inhibitor composition may include an azole. Examples of azoles include, but are not limited to TT, BZT, MBT, BBT, HRA, benzimidazoles, or their salts. The benzimidazoles may be 2-substituted benzimidazoles. In some aspects, the azole is TT.

In some aspects, the corrosion inhibitor composition may include a solvent. Examples of solvents include, but are not limited to, water, acetone, methanol, ethanol, propanol, formic acid, formamide, propylene glycol, ethylene glycol, or any combination thereof. In some aspects, the corrosion inhibitor composition may include water.

In some aspects, the corrosion inhibitor composition may consist of a compound of formula (I). In some aspects, the corrosion inhibitor composition may consist of a compound of formula (I) and a buffer. In some aspects, the corrosion inhibitor composition may consist of water; the compound of formula (I); a buffer; and a silicate.

In some aspects, a corrosion inhibitor composition containing polymaleic acid or salt thereof, a silicate and a buffer may comprise about 1% to about 99% by weight of the polymaleic acid; about 0.5% to about 90% by weight of the silicate; and about 0.5% to about 20% by weight of the buffer.

In some aspects, the amount of the compound of formula (I) or salt thereof added to the aqueous medium ranges from about 10 ppm to about 50,000 ppm. In some aspects, the amount of the compound of formula (I) ranges from about 10 ppm to about 500 ppm. In some aspects, the amount of the compound of formula (I) ranges from about 60 ppm to about 100 ppm.

In some aspects, the amount of buffer added to the aqueous medium ranges from about 10 ppm to about 50,000 ppm. In some aspects, the amount of buffer added ranges from about 10 ppm to about 500 ppm or from about 25 ppm to about 150 ppm.

In some aspects, the amount of silicate added to the aqueous medium ranges from about 1 ppm to about 50,000 ppm. In some aspects, the amount of silicate added ranges from about 1 ppm to about 50 ppm or from about 15 to about 100 ppm.

In some aspects, the azole or salt thereof may be added to the aqueous medium in an amount of about 0.1 ppm to about 1,000 ppm. In some aspects, the concentration of azole may be about 20 ppm to about 500 ppm. In some aspects, the concentration of azole is about 100 ppm, about 150 ppm, about 200 ppm, about 250 ppm, or about 300 ppm.

In some aspects, the method may include adding the corrosion inhibitor composition to the aqueous medium at a dosage amount of about 0.1% by volume to about 2% by volume. In some aspects, the dosage amount is about 0.2%, about 0.3%, about 0.4%, about 0.5%, about 0.6%, about 0.7%, about 0.8%, about 0.9%, or about 1.0% by volume.

A number of different metal surfaces may be in contact with the aqueous medium to with the corrosion inhibitor is added. For example, the different metal surfaces may comprise different metals or metal alloys such as mild steel, aluminum, or copper. In some aspects, the metal surface comprises a first metal surface comprising aluminum, a second metal surface comprising mild steel, a third metal surface comprising copper, or any combination thereof. In some aspects, the metal surface may include iron, an iron alloy, copper, a copper alloy, admiralty brass, about 90% copper and about 10% nickel, about 80% copper and about 20% nickel, about 70% copper and about 30% nickel, aluminium brass, manganese brass, leaded naval bronze, phosphor bronze, or any combination thereof. In some aspects, the metal surface may be at least part of an aluminum boiler. In some aspects, the corrosion inhibitor composition is added into an aluminum boiler. In some aspects, the corrosion inhibitor composition is added into a heat exchanger.

In some aspects, the metal surface may be an aluminum alloy.

Examples of aluminum alloys include, but are not limited to, Al360, Al4032, Al6061, Al7075, AlSi10Mg, AlSi12, H9-6060, a 1000 series alloy, a 2000 series alloy, a 4000 series alloy, a 5000 series alloy, a 6000 series alloy, a 7000 series alloy, a cast 1xx series alloy, a cast 2xx series alloy, a cast 3xx series alloy, a cast 4xx series alloy, a cast 5xx series alloy, a cast 6xx series alloy, a cast 7xx series alloy, or a cast 8xx series alloy.

The corrosion inhibitor composition may lower the corrosion rate of the metal surface. In some aspects, a corrosion rate of the metal surface may be less than about 1 mpy. In some aspects, a corrosion rate of the metal surface may be less than about 0.5 mpy.

In some aspects, corrosion inhibitor composition may lower pitting corrosion, crevice corrosion, exfoliation, and intergranular corrosion of aluminum alloys. As used herein "pitting corrosion" refers to localized accelerated dissolution of metals that occurs as a result of breakdown of the otherwise protective passive film on the metal/alloy surface. In general, pitting corrosion involves there stages: pitting initiation, metastable pitting, and pitting growth.

In some aspects, the corrosion inhibitor composition may include an additional additive. Examples of additives include, but are not limited to, an additional corrosion inhibitor, a treatment polymer, an anti-microbial agent, a colorant, a filler, a surfactant, a viscosity modifier, a chelating agent, a dispersant, a deodorant, a masking agent, an oxygen scavenger, or an indicator dye.

The corrosion inhibitor composition may include other additives. For example, the composition may include a phosphinosuccinic oligomer (PSO). In some aspects, the PSO may have a structure as depicted in formula (II)

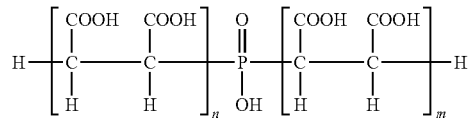

wherein n is an integer from 1 to 5 and m is an integer from 0 to 5. In some aspects, n is 1, 2, 3, 4, or 5. In some aspects, n is an integer from 2 to 5. In some aspects, n is an integer from 3 to 5. In some aspects, n is an integer from 1 to 4. In some aspects, n is an integer from 1 to 3. In some aspects, m is 0, 1, 2, 3, 4, or 5. In some aspects, m is 0. In some aspects, m is 1. In some aspects, m is 2. In some aspects, m is 3. In some aspects, m is 4. In some aspects, m is 5. In some aspects, the PSO may include one or more compounds of formula I. In some aspects, the PSO comprises about 10 to 40 wt % of a compound of formula I where n is 1 and m is 0, about 30 to 60 wt % of a compound of formula I where m is 1 and n is 1, and about 20 to 40 wt % of a compound of formula I where n is 1 and m is 2 to 5. U.S. Pat. No. 6,572,789 describes PSO polymers that can be used in the corrosion inhibitor composition and is incorporated by reference in its entirety.

In some aspects, the PSO is a mixture of compounds of formula 1. For example, the PSO may have molecules having n=1, 2, 3, 4, or 5 in a mixture.

In some aspects, the PSO may be added to the aqueous medium in an amount of about 10 ppm to about 10,000 ppm. In some aspects, the concentration of PSO may be about 50 ppm to about 1,000 ppm. In some aspects, the concentration of PSO is about 100 ppm, about 150 ppm, about 200 ppm, about 250 ppm, or about 300 ppm.

In some aspects, the corrosion inhibitor composition may include a scale inhibitor. The scale inhibitor may be a polymer. Examples of scale inhibitors include, but are not limited to, a polyacrylate (PAA), a polymaleic anhydride (PMA), an alkyl epoxy carboxylate (AEC), a polyacrylamide copolymer (AA/AM), an acrylic acid and hydroxypropylacrylate copolymer (AA/HPA), an acrylic acid and 2-acrylamido-2-methyl propane sulfonate copolymer (AA/AMPS), a maleic anhydride and sulfonated styrene copolymer (MA/SS), an acrylic acid/acrylamide/tertiary butyl acrylamide copolymer (AA/AM/t-BAM), an acrylic acid/2-acrylamido-2-methyl propane sulfonate/tertiary butyl acrylamide (AA/AMPS/t-BAM), an acrylic acid/sulfonated styrene/2-acrylamido-2-methyl propane sulfonate (AA/SS/AMPS), an acrylic acid/acrylamide/aminomethyl sulfonate copolymer (AA/AM/AMS), and any combination thereof.

In some aspects, the scale inhibitor comprises a copolymer of acrylic acid and t-BAM in a 60:40 mole ratio, respectively.

In some aspects, the scale inhibitor polymer may include about 80 to about 99 mole percent acrylic acid and from about 1 to about 20 mole percent AMPS. In some aspects, the copolymer may comprise about 95% acrylic acid and about 4% AMPS or about 90% acrylic acid and about 10% AMPS. In other aspects, the polymer may be a tetrapolymer comprising acrylic acid, itaconic acid, AMPS, and tertiary butyl acrylamide in any mole percent. Other polymers that may be used in the inhibitor compositions include, but are not limited to, copolymers of acrylic acid and AMPS comprising about 40 to about 70% acrylic acid and about 30 to about 60% AMPS. In other aspects, the polymer may be a copolymer comprising about 60% acrylic acid and about 40% AMPS or about 50% acrylic acid and about 50% AMPS.

In some embodiments, the scale inhibitor polymer may have a weight average molecular weight of about 5,000 Da to about 50,000 Da. In some embodiments, the polymer may have a weight average molecular weight of about 20,000 Da.

In some aspects, the scale inhibitor may include about 52 wt % water; about 47 wt % copolymer of acrylic acid and acrylamido tertiary-butyl sulfonic acid (ATBS); 0.23 wt % sodium sulfate; 0.01 wt % sodium bisulfite; and a trace amount of pyrenetetrasulfonic acid tetrasodium salt.

In certain aspects, the composition comprises an effective amount of the scale inhibitor, which may be appropriately selected by one of skill in the art. The amount of scale inhibitor added to the aqueous medium may range from about 0.1 ppm to about 100 ppm. In some aspects, the amount of scale inhibitor may range from about 1 ppm to about 50 ppm, about 0.5 ppm to about 20 ppm, about 1 ppm to about 10 ppm, or about 1 ppm to about 20 ppm. In other aspects, the amount of scale inhibitor may range from about 5 ppm to about 30 ppm, about 10 ppm to about 20 ppm, or about 5 ppm to about 20 ppm. In some aspects, the amount of scale inhibitor added to the aqueous system may be about 5 ppm, about 6 ppm, about 7 ppm, about 8 ppm, about 9 ppm, about 10 ppm, about 11 ppm, about 12 ppm, about 13 ppm, about 14 ppm, or about 15 ppm.

In some aspects, the corrosion inhibitor composition may include an inert tracer, making it compatible with fluorescent tracing technology, such as 3D TRASAR® technology (available from Nalco Water, an Ecolab Company). In other aspects, an inert fluorescent tracer may be included in the composition to provide a means of determining the dosage level. A known proportion of the fluorescent tracer may be added either simultaneously or sequentially with the dispersants or anti-foaming agents. Effective inert fluorescent tracers may include those substances that are chemically non-reactive with other components in the system and that do not significantly degrade with time.

Representative inert fluorescent tracers include fluorescein or fluorescein derivatives; rhodamine or rhodamine derivatives; naphthalene sulfonic acids (mono-, di-, tri-, etc.); pyrene sulfonic acids (mono-, di-, tri-, tetra-, etc.); stilbene derivatives containing sulfonic acids (including optical brighteners); biphenyl sulfonic acids; phenylalanine; tryptophan; tyrosine; vitamin B2 (riboflavin); vitamin B6 (pyridoxin); vitamin E (a-tocopherols); ethoxyquin; caffeine; vanillin; naphthalene sulfonic acid formaldehyde condensation polymers; phenyl sulfonic acid formaldehyde condensates; lignin sulfonic acids; polycyclic aromatic hydrocarbons; aromatic (poly)cyclic hydrocarbons containing amine, phenol, sulfonic acid, carboxylic acid functionalities in any combination; (poly)heterocyclic aromatic hydrocarbons having N, O, or S; a polymer containing at least one of the following moieties: naphthalene sulfonic acids, pyrene sulfonic acids, biphenyl sulfonic acids, or stilbene sulfonic acids.

In some aspects, the additional corrosion inhibitor may be zinc, aluminum, manganese, nickel, silicate, molybdate, strontium, titanium, chromate, cobalt, cerium, any salt thereof, any oxide thereof, or any combination thereof. In some embodiments, the additional corrosion inhibitor may include zinc or any oxide thereof. The additional corrosion inhibitors may be in the form of any salt or any oxide. Illustrative, non-limiting examples of inorganic salts may be chloride, nitrate, nitrite, or sulfate. The salt form may be organic including, but not limited to, acetate or citrate salts.

Each component of the corrosion inhibitor composition may be added separately or as a mixture, and the addition may be manual addition or automatic addition using chemical injection pumps and the automated system described herein. The compositions (or components thereof) may be dosed periodically or continuously into the aqueous system.

The aqueous medium to which the corrosion inhibitor composition is added may have certain properties that are specific for the specific process. For example, a closed loop system may have a recommended pH operating range or solute concentration. In some aspects, the aqueous medium may have a pH of from about 6 to about 12. In some aspects, the aqueous medium may have a pH of about 6, about 6.5, about 7, about 7.5, about 8, about 8.5, about 9, about 9.5, about 10, about 10.5, about 11, about 11.5, or about 12. In general, about 7.5 to about 8.5 is the recommended pH range for boilers having significant aluminum content.

In some aspects, the aqueous medium has a chloride concentration of less than about 150 ppm. The conductivity of the aqueous medium may range from about zero µS/cm to thousands or tens of thousands µS/cm. The conductivity may be above about 500 µS/cm, above about 1,000 µS/cm, or above about 5,000 µS/cm.

The aqueous medium may comprise an anti-freeze agent such as ethylene glycol or propylene glycol. The concentration of the glycol may range from about 20% to about 50% by volume.

In some aspects, the aqueous medium includes an oxidizing halogen compound such as, for example, bleach. Examples of oxidizing halogen compounds include, but are not limited to, hypochlorite bleach, chlorine, bromine, hypochlorite, hypobromite, chlorine dioxide, iodine/hypoiodous acid, hypobromous acid, a halogenated hydantoin, a peroxide, a persulfate, a permanganate, a peracetic acid or any combination thereof.

In some aspects, the aqueous medium may include a non-halogen-containing oxidizing biocide. Examples of non-halogen-containing oxidizing biocides include, but are not limited to, 5-chloro-2-methyl-4-isothiazolin-3-one, 2-methyl-4-isothiazolin-3-one, glutaraldehyde, dibromo propionic acid, quaternary ammonium salts or any combination thereof.

The presently disclosed inhibitor compositions may be used in any aqueous system comprising surfaces susceptible of corrosion. For example, the inhibitor compositions may be used in once-through, open loop, or closed loop recirculating cooling water systems. Other aqueous systems include, but are not limited to, systems used in petroleum production and oil recovery (e.g., well casing transport pipelines, etc.) and refining, geothermal wells, and other oil field applications; boilers and boiler water systems; systems used in power generation, mineral process waters including mineral washing, flotation and benefaction; paper mill digesters, washers, bleach plants, white water systems and mill water systems; black liquor evaporators in the pulp industry; gas scrubbers and air washers; continuous casting processes in the metallurgical industry; air conditioning and refrigeration systems; building fire protection heating water, such as pasteurization water; water reclamation and purification systems; membrane filtration water systems; food processing streams and waste treatment systems as well as in clarifiers, liquid-solid applications, municipal sewage treatment systems; and industrial or municipal water distribution systems.

In some aspects, the aqueous system may be a cooling system, a boiler system, a heating system, a membrane system, a paper making system, a food and beverage system, an oil and gas system, or any system that comprises water.

In particular aspects of the present disclosure, the inhibitor compositions may be used in connection with warewashing compositions. Warewashing compositions may be used for protecting articles, such as glassware or silverware, from corrosion in a dishwashing or warewashing machine. However, it is to be understood that the warewashing compositions comprising the presently disclosed inhibitor compositions can be available for cleaning environments other than inside a dishwashing or warewashing machine.

In certain aspects, the disclosed inhibitor compositions may have one or more of the following characteristics:

Halogen stability up to about 0.5 ppm free residual chlorine (FRC);
Ability to handle water temperatures up to about 100° C.;
Compatibility with azoles, dispersants, and cooling water polymers;
Calcium tolerance up to about 500 ppm as $CaCO_3$;
Chloride tolerance up to about 600 ppm as Cl;
Stability over a pH from about 6 to about 9;
Low toxicity (e.g. $LC_{50}$>100 mg/L); and
Stable for a Holding Time Index (HTI) of from a few seconds up to about 5 years.

In some aspects, the temperature of the aqueous medium may be about 4° C. to about 100° C. In a pressurized closed loop system, the temperature of the water may exceed about 100° C. and the compositions of the present disclosure may be used at such temperatures.

Any of the presently disclosed aqueous systems may be automatically monitored and controlled. For example, the pH of the systems may be monitored and controlled or the amount of inhibitor composition in the aqueous system may be monitored and controlled.

The present disclosure also describes an on-line unit and system for measuring, controlling, and/or optimizing one or more system parameters or properties of water. Optimization can include, for example, measuring one or more properties associated with the water to be sure that the one or more properties are within an acceptable, predetermined range and, if the one or more properties are not within the acceptable, predetermined range for each respective property being measured, causing a change in the water to bring the property back within the acceptable, predetermined range.

In certain embodiments, the system includes a monitoring and controlling unit that comprises a controller and a plurality of sensors. Each of the plurality of sensors can be in communication with the controller. For example, if the unit comprises five sensors, each of the five sensors can be in communication with the controller. In certain aspects, the controller can be attached to a skid, or other type of support member, to allow for mobility.

As used herein, the term "controller" refers to a manual operator or an electronic device having components, such as a processor, memory device, digital storage medium, a communication interface including communication circuitry operable to support communications across any number of communication protocols and/or networks, a user interface (e.g., a graphical user interface that may include cathode ray tube, liquid crystal display, plasma display, touch screen, or other monitor), and/or other components.

The controller is preferably operable for integration with one or more application-specific integrated circuits, programs, computer-executable instructions or algorithms, one or more hard-wired devices, wireless devices, and/or one or more mechanical devices. Moreover, the controller is operable to integrate the feedback, feed-forward, and/or predictive loop(s) of the invention. Some or all of the controller system functions may be at a central location, such as a network server, for communication over a local area network, wide area network, wireless network, internet connection, microwave link, infrared link, wired network (e.g., Ethernet) and the like. In addition, other components, such as a signal conditioner or system monitor, may be included to facilitate signal transmission and signal-processing algorithms.

In certain aspects, the controller includes hierarchy logic to prioritize any measured or predicted properties associated with system parameters. For example, the controller may be programmed to prioritize system pH over conductivity, or vice versa. It should be appreciated that the object of such hierarchy logic is to allow improved control over the system parameters and to avoid circular control loops.

In some embodiments, the monitoring and controlling unit and method associated therewith includes an automated controller. In some embodiments, the controller is manual or semi-manual. For example, when the system includes one or more datasets received from various sensors in the system, the controller may either automatically determine which data points/datasets to further process or an operator may partially or fully make such a determination. A dataset for an industrial body of water, for instance, may include variables or system parameters such as oxidation/reduction potential (ORP), dissolved oxygen (DO), conductivity, pH, turbidity, concentrations of certain chemicals, such as biocides, scale inhibitors, friction reducers, acids, bases, and/or oxygen scavengers, levels of ions (e.g., determined empirically, automatically, fluorescently, electrochemically, colorimetrically, measured directly, calculated), temperature, pressure, flow rate, total dissolved or suspended solids, etc. Such system parameters are typically measured with any type of suitable data capturing equipment, such as sensors designed specifically for these parameters, e.g., pH sensors, ion analyzers, temperature sensors, thermocouples, pressure sensors, corrosion probes, and/or any other suitable device or sensor. Data capturing equipment is in communication with the controller and, according to some embodiments, may have advanced functions (including any part of the control algorithms described herein) imparted by the controller.

The monitoring and controlling unit may comprise a plurality of sensors, which are capable of analyzing the water and transmitting data regarding the water to the controller. The plurality of sensors can comprise, for example, sensors for measuring conductivity, pH, ORP, biocide concentration, turbidity, temperature, flow, and DO in the water. The monitoring and controlling unit may comprise any of these sensors, all of these sensors, a combination of two or more of these sensors, one or more additional sensors not specifically mentioned here, and the sensors may be in communication with the controller. Other types of sensors contemplated by the present disclosure include, but are not limited to, oil in water sensors, total dissolved solids sensors, and total suspended solids sensors.

The presently disclosed monitoring and controlling system comprises, in certain embodiments, one or more chemical injection pumps. Each chemical injection pump may be in fluid communication with a storage device. Each storage device may comprise one or more chemicals and the chemical injection pumps may transport those chemicals into the body of water. In some embodiments, the chemical injection pump comprises the storage device. The chemical injection pumps may be in communication with the controller in any number of ways, such as through any combination of wired connection, a wireless connection, electronically, cellularly, through infrared, satellite, or according to any other types of communication networks, topologies, protocols, standards and more. Accordingly, the controller can send signals to the pumps to control their chemical feed rates.

In certain embodiments, the monitoring and controlling system is implemented to have the plurality of sensors provide continuous or intermittent feedback, feed-forward, and/or predictive information to the controller, which can relay this information to a relay device, such as the Nalco Global Gateway, which can transmit the information via cellular communications to a remote device, such as a cellular telephone, computer, and/or any other device that can receive cellular communications. This remote device can interpret the information and automatically send a signal (e.g. electronic instructions) back, through the relay device, to the controller to cause the controller to make certain adjustments to the output of the pumps. The information can also be processed internally by the controller and the controller can automatically send signals to the pumps to adjust the amount of chemical injection, for example. Based upon the information received by the controller from the plurality of sensors or from the remote device, the controller may transmit signals to the various pumps to make automatic, real-time adjustments, to the amount of chemical that the pumps are injecting into the water.

Alternatively, an operator of the remote device that receives cellular communications from the controller can manually manipulate the pumps through the remote device. The operator may communicate instructions, through the remote device, cellularly or otherwise, to the controller and the controller can make adjustments to the rate of chemical addition of the chemical injection pumps. For example, the operator can receive a signal or alarm from the remote device through a cellular communication from the controller and send instructions or a signal back to the controller using the remote device to turn on one or more of the chemical injection pumps, turn off one or more of the chemical injection pumps, increase or decrease the amount of chemical being added to the water by one or more of the injection pumps, or any combination of the foregoing. The controller and/or the remote device is also capable of making any of the foregoing adjustments or modifications automatically without the operator actually sending or inputting any instructions. Preset parameters or programs are entered into the controller or remote device so that the controller or remote device can determine if a measured property is outside of an acceptable range. Based on the information received by the plurality of sensors, the controller or remote device can make appropriate adjustments to the pumps or send out an appropriate alert.

EXAMPLES

The pilot closed loop test equipment included a coupon rack built upon a recirculating water bath. The water bath had an operating temperature ranging from about −30° C. to 200° C. depending on the circulating media used. Typically, the testing temperatures were about 10° C., about 60° C., or about 80° C. to mimic both cooling and heating loops. Corrosion inhibitor performance was evaluated via metal coupon inspection or via an online electrochemical method (Linear Polarization Resistance).

Corrosion Inhibitor performance was also evaluated using stirred and stagnant jar testing. In these tests, a mild steel coupon was submerged in water for a period of time. The coupon was then removed from the jar and inspected for weight loss.

Three water matrices were used for most of the tests. Naperville, Illinois tap water (W1) is a low corrosion stress water due to the relatively high calcium and alkalinity, and low concentration of corrosive ions such as chloride and sulfate. To increase the corrosivity of the water, and stress the corrosion inhibitors, additional chloride (sodium chloride) and sulfate (sodium sulfate) were added into Naperville tap water to reach about 150 ppm chloride and about 200 ppm sulfate (W2). Typically, a test was performed at about 60° C. with W2 to test the performance of a newly developed formula for its performance robustness. A chloride concentration of about 150 ppm, and a sulfate concentration of about 200 ppm, would represent 80% of the make-up water in the United States. A third water matrix was used to simulate the makeup water typically used for closed loop cooling water applications (W3). A summary of the waters used in these experiments is displayed in Table 1.

TABLE 1

Water Matrices Used in Corrosion Inhibitor Experiments

| Component | W1 | W2 | W3 |
|---|---|---|---|
| Ca (as $CaCO_3$), ppm | 88 | 88 | 42 |
| Mg (as $CaCO_3$), ppm | 44 | 44 | 5.5 |
| Cl, ppm | 15 | 150 | 30 |
| $SO_4$, ppm | 26 | 200 | 5 |
| Alkalinity, ppm $CaCO_3$ | 110 | 110 | 32 |

Example 1

Jar test results are shown In Tables 2 and 3. Entries 1-12 show a series of experiments investigating the dose profile of the closed loop corrosion inhibitor package in two different waters using mild steel coupons at about 60° C. The components investigated in these experiments were polymaleic acid (about 82-410 ppm), sodium tolyltriazole (about 10-52 ppm), dispersant (copolymer of polyacrylic acid and AMPS, about 3-15 ppm), $SiO_2$ (about 16-79 ppm), and sodium carbonate (about 23-114 ppm). The two waters used in the experiments were W2 and W3. Results show that the main mild steel corrosion inhibitor, polymaleic acid, is capable of mitigating corrosion on mild steel at dosages as low as about 82 ppm in both W2 and W3. Entries 1 and 7 are control experiments without added corrosion inhibitor components. Entries 13-18 show that the individual components in the absence of PMA are not acceptable corrosion inhibitors.

Entries 19-24 compared the performance of the compositions in the present application (Entries 19 and 22) against incumbent corrosion inhibitors based on molybdate and nitrite at two different pH values. At pH 9, which represents a common pH encountered in closed loop applications, Entry 19 outperforms the molybdate-based corrosion inhibitor (Entry 20) and is comparable in performance to the nitrite-based corrosion inhibitor (Entry 21). At pH 7.5, nitrite-based corrosion inhibitor yields excellent corrosion inhibition (Entry 24), however both Entry 22 and molybdate-based corrosion inhibitor (Entry 23) yield poor corrosion inhibition. PMA is polymaleic acid, Na TT is sodium tolyltriazole, Disp. is a copolymer of polyacrylic acid and AMPS, Na PAA is sodium polyacrylate, TEA is triethanolamine, and Na BZT is sodium benzotriazole. The amounts in the table are in ppm unless otherwise specified. RT refers to room temperature, which is considered to be about 20° C.

TABLE 2

Jar Test Results

| Entry | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Water | W3 | W3 | W3 | W3 | W3 | W3 | W2 | W2 | W2 | W2 | W2 | W2 | W2 | W2 |
| pH | 7.0 | 10 | 10 | 10 | 10 | 10 | 10 | 10 | 10 | 10 | 10 | 10 | 10 | 10 |
| Time (days) | 18 | 18 | 18 | 18 | 18 | 18 | 18 | 18 | 18 | 18 | 18 | 18 | 14 | 14 |
| Temp, C. | 60 | 60 | 60 | 60 | 60 | 60 | 0 | 60 | 60 | 60 | 60 | 60 | 60 | 60 |
| PMA | 0 | 82 | 164 | 246 | 328 | 410 | 0 | 82 | 164 | 246 | 328 | 410 | 0 | 0 |
| Na TT | 0 | 10 | 21 | 31 | 41 | 52 | 0 | 10 | 21 | 31 | 41 | 52 | 30 | 0 |
| Disp. | 0 | 3 | 6 | 9 | 12 | 15 | 0 | 3 | 6 | 9 | 12 | 15 | 0 | 0 |
| Na PAA | 0 | 0 | 0 | 0 | 0 | 0 | 0 | 0 | 0 | 0 | 0 | 0 | 0 | 0 |
| $SiO_2$ | 0 | 16 | 32 | 48 | 63 | 79 | 0 | 16 | 32 | 48 | 63 | 79 | 0 | 0 |
| $Na_2CO_3$ | 0 | 23 | 46 | 68 | 91 | 114 | 0 | 23 | 46 | 68 | 91 | 114 | 0 | 122 |
| TEA | 0 | 0 | 0 | 0 | 0 | 0 | 0 | 0 | 0 | 0 | 0 | 0 | 0 | 0 |
| $NaNO_2$ | 0 | 0 | 0 | 0 | 0 | 0 | 0 | 0 | 0 | 0 | 0 | 0 | 0 | 0 |
| $NaMoO_4$ | 0 | 0 | 0 | 0 | 0 | 0 | 0 | 0 | 0 | 0 | 0 | 0 | 0 | 0 |
| $Na_2B_4O_7$ | 0 | 0 | 0 | 0 | 0 | 0 | 0 | 0 | 0 | 0 | 0 | 0 | 0 | 0 |
| Na BZT | 0 | 0 | 0 | 0 | 0 | 0 | 0 | 0 | 0 | 0 | 0 | 0 | 0 | 0 |
| Mild Steel, mpy | 19.9 | 0.3 | 0.1 | 0.1 | 0.2 | 0.4 | 23.5 | 5.8 | 1.1 | 0.2 | 0.2 | 0.2 | 17.8 | 17 |

TABLE 3

Jar Test Results Continued

| Entry | 15 | 16 | 17 | 18 | 19 | 20 | 21 | 22 | 23 | 24 |
|---|---|---|---|---|---|---|---|---|---|---|
| Water | W2 | W2 | W2 | W2 | W2 | W2 | W2 | W2 | W2 | W2 |
| pH | 10 | 10 | 10 | 10 | 9 | 9 | 9 | 7.5 | 7.5 | 7.5 |
| Time (days) | 14 | 14 | 14 | 14 | 54 | 54 | 54 | 54 | 54 | 54 |
| Temp, C. | 60 | 60 | 60 | 60 | RT | RT | RT | RT | RT | RT |
| PMA | 0 | 0 | 0 | 0 | 374 | 0 | 0 | 374 | 0 | 0 |
| Na TT | 0 | 0 | 0 | 0 | 47 | 0 | 50 | 47 | 0 | 50 |
| HSP2 | 0 | 16 | 0 | 0 | 13 | 0 | 0 | 13 | 0 | 0 |
| Na PAA | 0 | 0 | 0 | 0 | 0 | 0 | 328 | 0 | 0 | 328 |
| $SiO_2$ | 0 | 0 | 85 | 0 | 72 | 45 | 0 | 72 | 45 | 0 |
| $Na_2CO_3$ | 0 | 0 | 0 | 0 | 0 | 0 | 0 | 0 | 0 | 0 |
| TEA | 454 | 0 | 0 | 0 | 281 | 0 | 0 | 281 | 0 | 0 |
| $NaNO_2$ | 0 | 0 | 0 | 0 | 0 | 0 | 1230 | 0 | 0 | 1230 |
| $NaMoO_4$ | 0 | 0 | 0 | 0 | 0 | 250 | 0 | 0 | 250 | 0 |

TABLE 3-continued

| | Jar Test Results Continued | | | | | | | | | |
|---|---|---|---|---|---|---|---|---|---|---|
| Entry | 15 | 16 | 17 | 18 | 19 | 20 | 21 | 22 | 23 | 24 |
| $Na_2B_4O_7$ | 0 | 0 | 0 | 0 | 0 | 78 | 0 | 0 | 78 | 0 |
| Na BZT | 0 | 0 | 0 | 0 | 0 | 13 | 0 | 0 | 13 | 0 |
| Mild Steel, mpy | 19.5 | 17.5 | 10.7 | 17.6 | 0.1 | 1.9 | 0.1 | 1 | 2.2 | <0.1 |

Example 2

Closed Loop test results are displayed in Table 4. Entries 1-3 show the corrosion inhibition results of polymaleic acid-based, carbonate buffered corrosion inhibitor compositions. Entries 1 and 2 show good corrosion inhibitor performance with varying concentrations of sodium carbonate (115, 204 ppm). Entry 3 shows that the composition is effective even without $SiO_2$ present. Entry 4 shows the corrosion inhibition performance of an incumbent nitrite-based corrosion inhibitor. The nitrite-base corrosion inhibitor exhibits good performance indicating that the test method is valid. Entries 6-8 demonstrate the effectiveness of using TEA as buffer in place of sodium carbonate. Entry 6 shows that the TEA-containing composition is capable of good mild steel corrosion inhibition even at pH 7.3 at about 80° C. in W2. Entry 8 shows good performance of the PMA-based, TEA-buffered compositions in W1 at about 80° C. N-Methyl is N-methylimidazole. AB is admiralty brass.

TABLE 4

| | Closed Loop Test Results | | | | | | | |
|---|---|---|---|---|---|---|---|---|
| Entry | 1 | 2 | 3 | 4 | 5 | 6 | 7 | 8 |
| Water | W2 | W2 | W2 | W3 | W2 | W2 | W2 | W1 |
| pH | 10.3-8.5 | 10.3-8.5 | 10.3-8.5 | — | 10.3-8.6 | 7.3 | 7.3 | 9.0-10.5 |
| Temp. ° C. | 60 | 60 | 60 | 60 | 60 | 80 | 80 | 80 |
| Time (days) | 42 | 42 | 41 | 24 | 25 | 9 | 8 | 40 |
| PMA | 417 | 387 | 401 | 0 | 410 | 349 | 175 | 468 |
| Na TT | 53 | 49 | 51 | 50 | 52 | 88 | 44 | 81 |
| HSP2 | 15 | 14 | 14 | 0 | 15 | 12 | 6 | 12.5 |
| Na PAA | 0 | 0 | 0 | 328 | 0 | 0 | 0 | 0 |
| $SiO_2$ | 81 | 75 | 0 | 0 | 79 | 0 | 0 | 120 |
| $Na_2CO_3$ | 115 | 204 | 111 | 0 | 0 | 0 | 0 | 0 |
| TEA | 0 | 0 | 0 | 0 | 0 | 1412 | 706 | 561 |
| N-Methyl | 0 | 0 | 0 | 0 | 114 | 0 | 0 | 0 |
| $NaNO_2$ | 0 | 0 | 0 | 1230 | 0 | 0 | 0 | 0 |
| Cu, mpy | 0.1 | 0.1 | 0.1 | 0.2 | 0.2 | * * * | * * * | Good |
| AB, mpy | <0.1 | <0.1 | <0.1 | 0.1 | 0.1 | * * * | * * * | * * * |
| Mild Steel, mpy | 0.25 | 0.45 | 0.1 | 0.3 | 0.2 | Good | Poor | Good |

Example 3

Compounds of formulae (III)-(VI), hydrolyzed polymaleic acid (HPMA), were tested for the corrosion control of Aluminum alloys. HPMA does provide great protection to some of the aluminum alloys such as Al1100, Al6061, among others. Surprisingly, it also provides great corrosion protection to mild steel coupons at about 80° C. with W1 water. HPMA was further tested in W2 water at about 80° C., the great corrosion control of mild steel was demonstrated. HPMA is sufficiently effective to replace molybdate and nitrite for mild steel corrosion control in closed loop applications.

A formulation of HPMA was prepared containing about 17 wt % of HPMA, about 63 wt % TEA, and about 1.7 wt % of TT. W1 water was used at pH of about 7.9 and temperature of about 80° C. The concentration of HPMA in the water containing the metal test coupon was about 375 ppm. The concentration of TEA was about 1583 ppm. The concentration of TT was about 42 ppm.

Results showed that after about 6 days the corrosion rate of a mild steel coupon was about 0.4 mpy, 0.0 mpy for copper, admiralty metal was about 0.0 mpy, and Al1100 was about 4.8 mpy.

Another formulation of HPMA was prepared containing about 18 wt % of HPMA, about 56 wt % TEA, and about 3 wt % of TT. W2 water was used at pH of about 7.45 to about 7.57 and temperature of about 80° C. The concentration of HPMA in the water containing the metal test coupon was about 440 ppm. The concentration of TEA was about 1412 ppm. The concentration of TT was about 75 ppm. The concentration of dispersant was about 10 ppm.

Results showed that after about two weeks the corrosion rate of a mild steel coupon was about 0.53 mpy, 0.05 mpy for copper, about 0.74 mpy for Al6061, and about 0.6 mpy for Al1100.

Example 4

A formulation of HPMA was prepared containing about 21 wt % of HPMA, about 10 wt % NaOH, about 3.6 wt % of TT, about 2.75 wt % of mercaptobenzothiazole, and about 5.4 wt % of $Na_2SiO_3.5H_2O$. W1 water was used at pH of about 9.4 to about 10.5 and temperature of about 25° C. The concentration of HPMA in the water containing the metal test coupon was about 520 ppm. The concentration of TT was about 90 ppm. The concentration of mercaptobenzothiazole was about 69 ppm. The concentration of Na$_2$SiO$_3$.5H$_2$O was about 135 ppm.

Results showed that after about 24 days the formulation provided protection for mild steel, copper, admiralty metal, galvanized steel, and Al7075. Another test using the same formulation but at a pH of about 9.11 to about 10.32 at 80° C. showed good protection for mild steel copper, Al6061, Al1100, and galvanized steel.

Example 5

A formulation of polymaleic acid (PMA) was prepared containing PMA, NaOH, TEA, TT, dispersant, water, and NaNO$_3$. The concentration of PMA in the water containing the metal test coupon was about 500 ppm. The concentration of TEA was about 600 ppm. The concentration of TT was about 84 ppm. The concentration of dispersant was about 13.5 ppm. The concentration of NaNO$_3$ was about 801 ppm.

Results showed that very good protection for galvanically coupled Al7075 with yellow metal. Mild steel and yellow metal coupons were also well protected. In W2 water at 60° C., the formulation protected Al360.

Example 6

A formulation of polyepoxysuccinic acid (PESA) was prepared containing PESA, water, TEA, TT, dispersant, and Na$_2$SiO$_3$.5H$_2$O. W2 water was used at a temperature of about 60° C. The concentration of PESA in the water containing the metal test coupon was about 2500 ppm.

Results showed that very good protection for very good protect for mild steel and copper.

Any composition disclosed herein may comprise, consist of, or consist essentially of any of the compounds/components disclosed herein. In accordance with the present disclosure, the phrases "consist essentially of," "consists essentially of," "consisting essentially of," and the like limit the scope of a claim to the specified materials or steps and those materials or steps that do not materially affect the basic and novel characteristic(s) of the claimed invention.

As used herein, the term "about" refers to the cited value being within the errors arising from the standard deviation found in their respective testing measurements, and if those errors cannot be determined, then "about" refers to within 10% of the cited value.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a polymer" is intended to include "at least one polymer" or "one or more polymers."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A method of inhibiting corrosion of a metal surface in contact with an aqueous medium, comprising:

contacting the metal surface in a closed loop system with a corrosion inhibitor composition, wherein the corrosion inhibitor composition comprises an azole and a compound of formula (I), or a salt thereof,

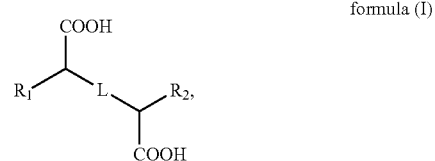

formula (I)

wherein

L is a single bond or a double bond;

R$_1$ is

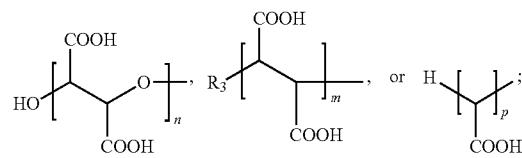

n is an integer from 1 to 100; m is an integer from 1 to 100; p is an integer from 2 to 20;

R$_3$ is —OH, —OCH$_3$, an aryl group, or a C$_1$-C$_4$ alkyl;

R$_2$ is hydrogen, —OH, —OCH$_3$, an aryl group, or a C$_1$-C$_4$ alkyl;

provided that when R$_1$ is

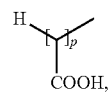

then L is a double bond; and adding the corrosion inhibitor composition to the aqueous medium, wherein the compound of formula (I) has a concentration of about 100 ppm to about 5,000 ppm in the aqueous medium, and the azole has a concentration of about 20 ppm to about 500 ppm in the aqueous medium, and wherein the corrosion inhibitor composition has a ratio of 5:1 to about 10:1 of the compound of formula (I) to the azole;

wherein the azole is selected from the group consisting of tolytriazole (TT), benzotriazole (BZT), mercaptobenzothiazole (MBT), butyl benzotriazole (BBT), halogen resistant azole (HRA), a benzimidazole, and any combination thereof; and wherein the corrosion inhibitor composition does not comprise zinc and phosphorus.

2. The method of claim 1, wherein $R_1$ is

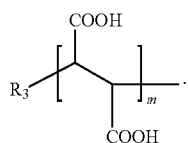

3. The method of claim 1, wherein $R_1$ is

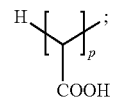

L is a double bond; and $R_2$ is hydrogen.

4. The method of claim 1, wherein $R_1$ is

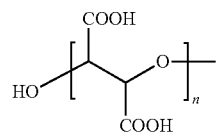

and $R_2$ is —OH.

5. The method of claim 1, wherein the corrosion inhibitor composition further comprises a silicate.

* * * * *